APPARATUS FOR AND METHOD OF ZERO SWITCHING

Filed Sept. 17, 1963

Inventors:
Thomas E. Carlisle
Edward J. Flannery
By Norman A. Witt
Atty.

APPARATUS FOR AND METHOD OF ZERO SWITCHING

Filed Sept. 17, 1963

3 Sheets-Sheet 2

Inventors:
Thomas E. Carlisle
Edward J. Flannery
By Norman A. Witt
Atty.

Inventors:
Thomas E. Carlisle
Edward J. Flannery
By Warren A. Witt
Atty.

United States Patent Office 3,283,179
Patented Nov. 1, 1966

3,283,179
APPARATUS FOR AND METHOD OF ZERO SWITCHING

Thomas E. Carlisle, Elmhurst, and Edward J. Flannery, Park Ridge, Ill., assignors to Vapor Corporation, Chicago, Ill., a corporation of Delaware Filed Sept. 17, 1963, Ser. No. 309,519
10 Claims. (Cl. 307—133)

The present invention relates to apparatus for and method of zero switching in an A.C. circuit.

In the use of A.C. circuits, when switching is performed an random, it most often occurs at some point between zero and maximum current, and seldom at zero current, because of the relatively small periods at which the current is at zero. When switching thus occurs at other than at a zero current value, the back E.M.F. and erratic currents developed in this circuit produce noise and other disturbances in the source and in other instruments connected with that source.

A broad object of the present invention is to provide novel apparatus for and method of switching at zero current in an A.C. circuit.

Another and more specific object is to provide apparatus for and method of switching of the character referred to above, including a novel arrangement wherein a composite signal is produced for controlling the switching means, this composite signal being composed of one produced by the means sensing the device to be controlled and another signal synchronized with the A.C. source.

Another and more specific object is to provide apparatus for and method of zero switching, of the general character referred to above, wherein a coincidence gate is provided, by means of which the composite signal mentioned is produced from two independent signals and is operative for effecting switching when both signals are present and for preventing switching unless both signals are present.

Still another object is to provide novel apparatus for and method of zero switching, which is extremely compact and effective, whereby to eliminate previously necessary large and burdensome components such as filters.

Other objects and advantages of the invention will appear from the following detailed description taken in conjunction with the accompanying drawings wherein.

The arrangement for zero switching may be incorporated in any of a number of end functions, as will be understood. In the present instance the load incorporated in the application of the invention includes an electrical resistance element for heating a medium such, for example, as air, liquid, etc., and a sensing element is utilized for sensing the temperature of that medium, and when the temperature reaches a maximum point according to a selected pre-setting, the heating element is turned off and when the temperature thereof lowers to a predetermined minimum, according to a selected pre-setting, the heating element is again turned on. The main embodiment of the invention described hereinbelow functions to turn on the apparatus at zero current condition, but alternative arrangements may be utilized for turning on at zero voltage condition, as described hereinbelow.

Figure 1:
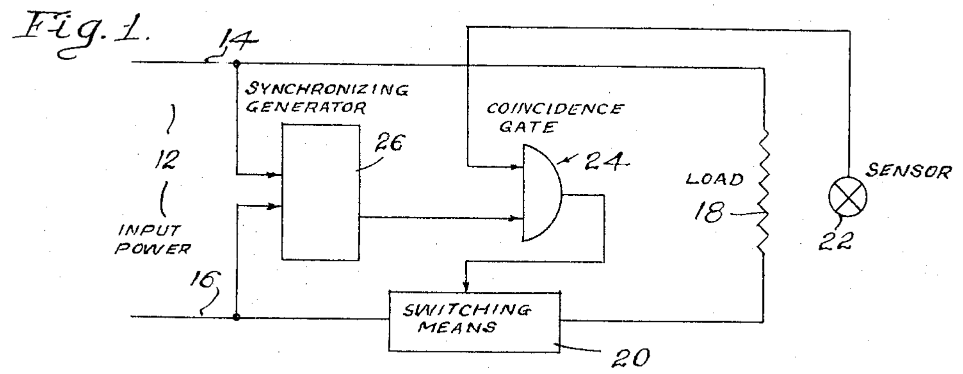
FIG. 1 is a diagrammatic illustration of the principal components of the apparatus.

Reference is first made to FIG. 1 which shows the main components of the apparatus in bare diagrammatic form. In this figure an A.C. source is indicated at 12 from which conductors 14 and 16 lead to a heater element 18 utilized for heating the medium referred to, the heater element being connected directly with the conductor 14 on one side, and with the conductor 16 on the other side through switching means 20. A sensing element 22 is utilized for sensing the temperature of the heated medium, such as the gas or liquid referred to, a signal being produced therein which is transmitted to a coincidence gate, or "AND" gate 24. Another signal is produced by a synchronizing generator 26, which is combined with the signal from the sensing element 22 in the coincidence gate, and the combined signal is transmitted to the switching means 20. The synchronizing generator 26 is connected across the conductors 14 and 16, as will be noted, and includes a number of individual components referred to in detail hereinbelow.

Figure 2:
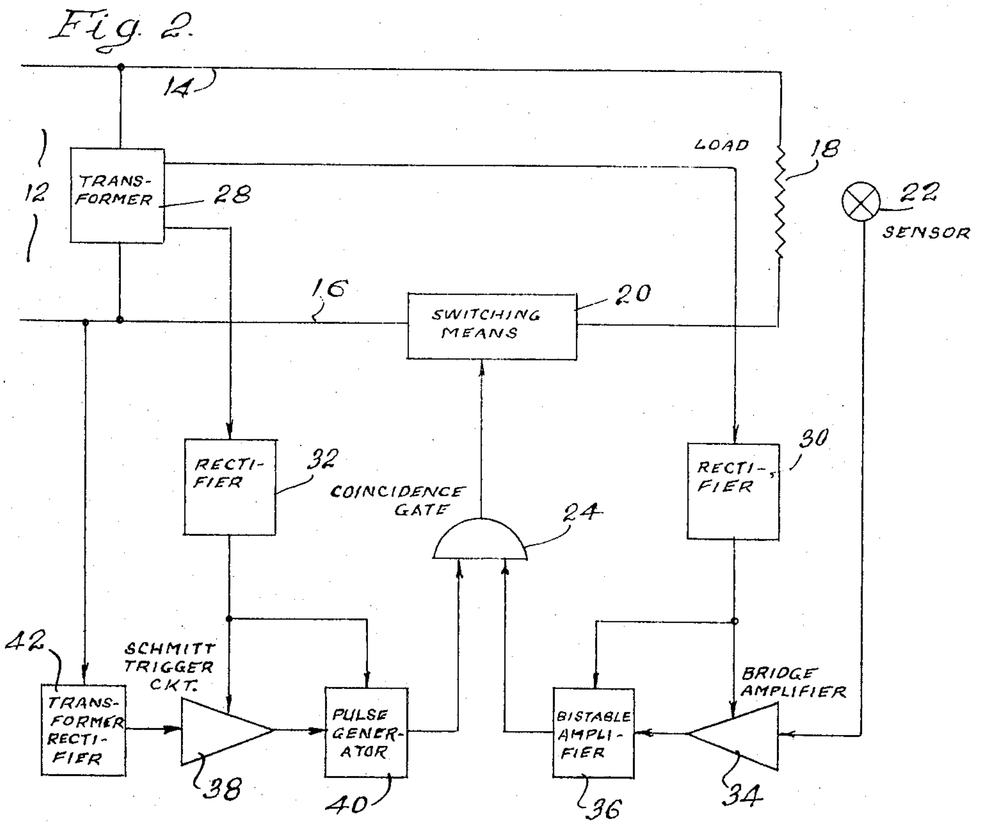
FIG. 2 is a diagrammatic illustration including the components of FIG. 1, and additional components.

Reference is now made to FIG. 2 showing the components incorporated in FIG. 1, namely the A.C. source 12, the conductors 14 and 16, the heater element 18, the switching means 20, the sensing element 22, and the coincidence gate 24. Also included in FIG. 2 is a transformer means indicated as a whole at 28 and connected across the conductors 14 and 16. Connected with the transformer means 28 are two rectifiers 30 and 32, the rectifier 30 leading to a bridge amplifier 34 and a bi-stable amplifier 36 which, in turn, leads to the coincidence gate 24; the other rectifier 32 leads to a "Schmitt" trigger circuit 38 which leads to a pulse generator 40 which, in turn, leads to the coincidence gate at a side thereof opposite the bi-stable amplifier 36. Another component 42, including a transformer and rectifier, is connected at the source 12 and leads to the "Schmitt" trigger circuit.

Figure 3:
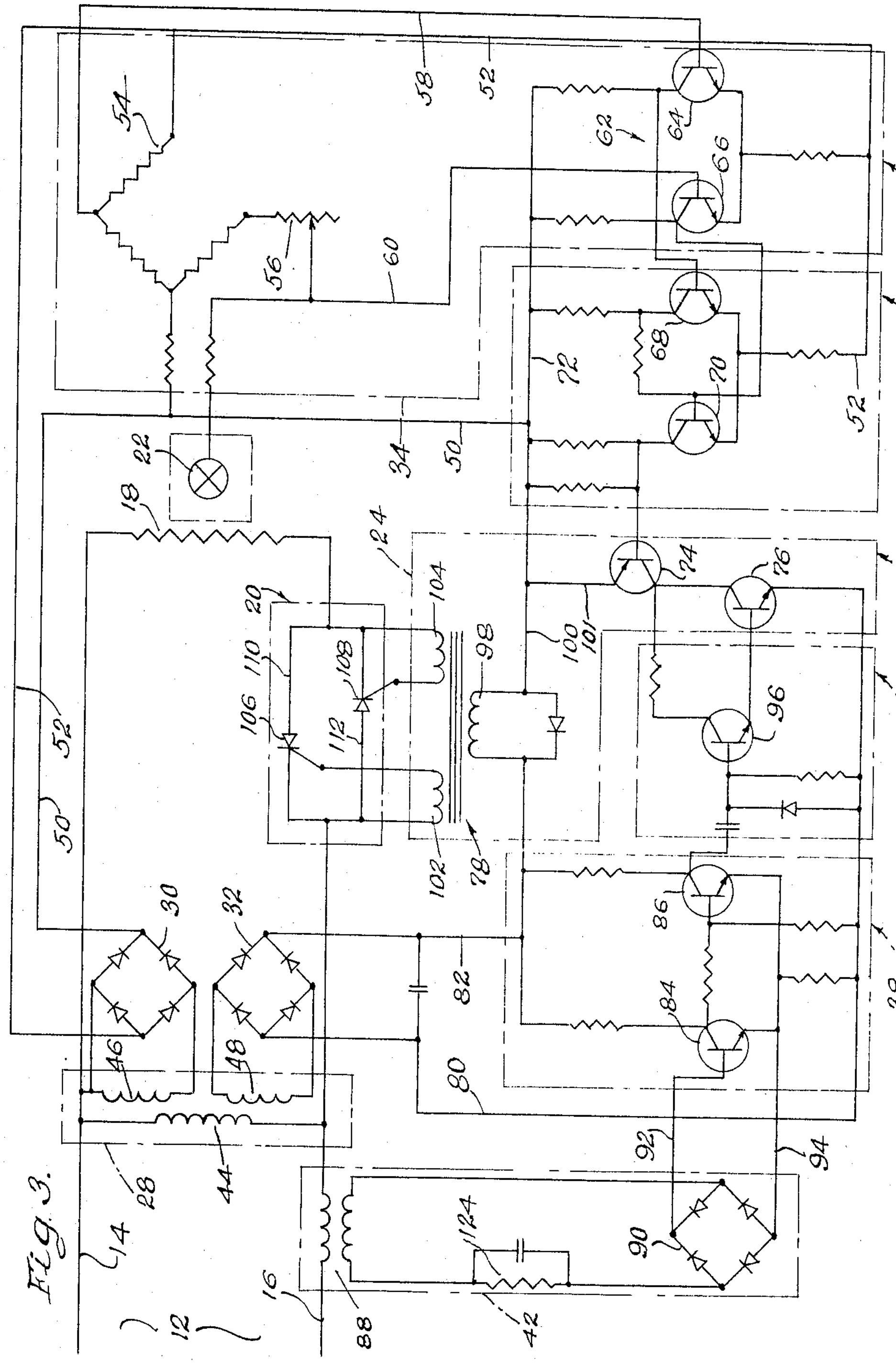
FIG. 3 is a circuit diagram of apparatus showing the details of the components of FIGS. 1 and 2.

Reference is now made to FIG. 3 showing in detail the components of FIGS. 1 and 2, in conjunction with the following description of the detail operation of the apparatus. The heater element 18, as shown in this figure, includes an electrical resistance element of known kind which, upon being energized and heated, heats the medium in which it was immersed. While the heater element 18 is shown as being in the form of a resistor, which is the preferred form, other forms may be utilized, as referred to again hereinbelow. In the case of the use of a resistor, the control elements and signals produced are based on simultaneous flow of current as contrasted with lagging current or leading current encountered in other elements.

The transformer means 28 includes a primary 44 connected across the conductors 14 and 16, and secondaries 46 and 48. The current developed in the secondary 46 is imposed on the rectifier 30, referred to above, and leading from the output terminals of the rectifier are conductors 50 and 52 connected with opposite lead-in points of a bridge circuit 54 incorporated in the bridge amplifier 34, referred to above. The sensing element 22 forms one leg of the circuit bridge 54, and a potentiometer 56 is arranged in series with the sensing element for selectively setting the point at which a signal will be produced by the bridge circuit as described below. The sensing element 22 is of conventional form and includes an element in which the current varies in response to temperature changes in the medium being heated, and thereby produces a change in the balance condition of the bridge circuit 54.

The output terminals of the bridge circuit 54 are connected with conductors 58 and 60, which lead to an amplifier 62 incorporated in the bridge amplifier component 34 referred to above. The amplifier 62 is of known character, including transistors 64 and 66 which are operative in a known manner for amplifying the signals produced by temperature changes in the sensing element 22 and the consequent balance condition of the bridge.

The amplified signals from the amplifier 62 are transmitted to the bi-stable amplifier 36, identified above, which is also of conventional construction. This bi-stable amplifier similarly includes transistors 68 and 70 under the control of the transistors 64 and 66 in the amplifier 62, and amplifies the signals as developed by the rectifier 30 and transmitted through the conductor 52 on one side and conductors 50 and 72 on the other side.

The bi-stable amplifier 36, as is known, has such characteristics that upon having been energized and turned on, it remains turned on or conducting, until again turned off, and the signal produced thereby is maintained at a substantially constant current value. The signal thus developed by the bi-stable amplifier 36 is imposed on a transistor 74 which is incorporated in the coincidence gate 24 identified above. Also incorporated in the coincidence gate is another transistor 76 and a transformer 78, which will be referred to again hereinbelow.

Referring again to the portion of the apparatus adjacent the source 12, the secondary 48 of the transformer 28 leads to the rectifier 32, also identified above, the output terminals of which are connected with conductors 80 and 82, which lead to the "Schmitt" trigger circuit 38. This "Schmitt" trigger circuit is of known kind and is effective for producing square waves in response to receiving pulsing or unfiltered D.C. The "Schmitt" trigger circuit includes series transistors 84 and 86.

The "Schmitt" trigger circuit 38 is controlled by the component 42, identified above. In this component 42 is a current transformer 88, the primary of which is connected to conductor 16 (or 14) and the secondary of which is connected to rectifier 90. This rectifier produces an unfiltered or pulsing direct current shown at 114 in FIG. 4. The conductors 92 and 94 leading from the output terminals of the rectifier 90 are connected with the transistors 84 and 86 for imposing thereon the signals developed by the rectifier 90 and in response thereto the "Schmitt" trigger circuit produces the square waves referred to.

The signals developed in the "Schmitt" trigger circuit 38 are imposed on the pulse generator 40 identified above and specifically on a transistor 96 therein; the pulse generator 40 is also of known type and develops spike signals 118 of FIG. 4, in response to the square wave signals generated by the "Schmitt" trigger circuit in a known manner and producing a function to be described hereinbelow.

The signals 118 developed by the pulse generator are imposed on the transistor 76 in the coincidence gate 24. The transformer 78 includes a primary 98 connected between the conductors 100 and 82, the conductor 100 being connected with the transistor 74 through the conductor 101. The transformer 78 includes two secondaries 102 and 104 connected respectively with silicon controlled rectifiers 106 and 108 incorporated in the switching means 20. These rectifiers are included in and arranged oppositely in respective parallel branch conductors 110 and 112 in the conductor 16, being arranged for alternate transmission of opposite half-waves of the A.C. These silicon controlled rectifiers and their function are known. Upon energization of the secondaries 102 and 104, and consequent development of signals therein, the corresponding silicon controlled rectifiers are turned on and so long as the signals persist these rectifiers remain on and complete the circuit between the heating element 18 and the source 12. The signals are developed in the secondaries 102 and 104 in response to the control of the transistors 74 and 76 (in the coincidence gate 24) which, in turn, are controlled by individual signals, one a signal from the heating element 22 and the other a signal from the control means 42. It will also be shown that these two individual signals arise or are generated together only at zero current condition.

Figure 4:
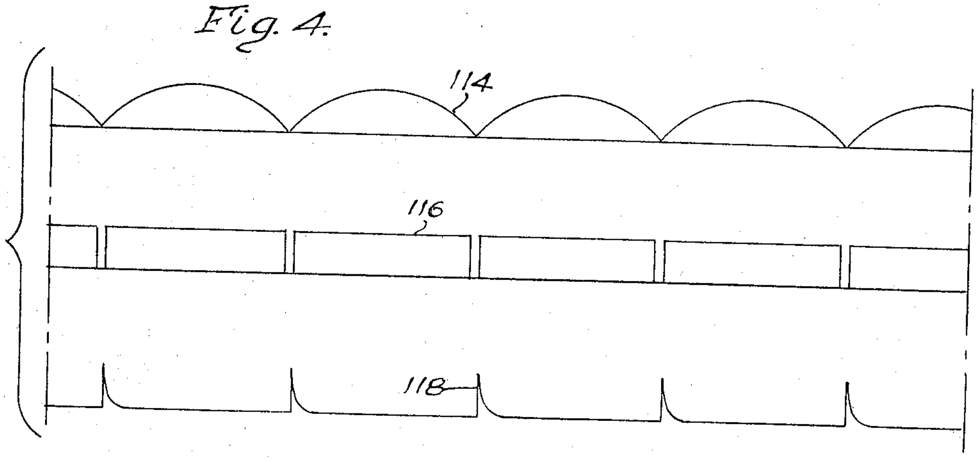
FIG. 4 is a diagram of the forms of current produced by certain of the components of the apparatus.

To summarize the operation of the device: When the temperature of the heated medium drops below the predetermined set temperature, an unbalanced condition develops in the bridge circuits 54 and a signal is transmitted through the amplifier 62 to the bi-stable amplifier 36, which remains on and holds the signal effective. This signal is imposed on the transistor 74 and holds it in signal transmitting condition. The signal thus produced is not transmitted beyond the transistor 74, in accordance with the characteristics of the coincidence gate 24, but is made effective upon control signals developed as follows:

The rectifier 90, in response to current developed by the transformer 88, produces the pulsing signals represented at 114 in FIG. 4. These signals are transmitted to the "Schmitt" trigger circuit 38 and converted thereby into the square wave signals 116. The square wave signals from the "Schmitt" trigger circuit are transmitted to the pulse generator 40 which converts the signals into the spike signals 118. This pulse generator develops the spike signals 118 at the beginning of the square wave signals 116 and thus at zero current condition. These signals 118 are transmitted to the transistor 76 (in the coincidence gate) and render it in conducting condition whereby current can be transmitted therethrough from the conductor 80, this current also passing through the transistor 74 which, as noted above, is in conducting condition in accordance with the signal received from the heater element 22. The current continues through conductors 101 and 100, primary 98, and in return through the conductor 82 to the rectifier 32. The signals thus developed in the primary 98 generate signals in the secondaries 102 and 104 which turn on or energize the respective silicon controlled rectifiers 106 and 108 with consequent completion of the circuit between the heating element 18 and the source 12.

The signals 118 produced by the pulse generator 14 rapidly decay, but the conducting condition established through the coincidence gate 24 persists and the signals imposed on the silicon controlled rectifiers also persist and retain them conducting through the respective half cycles of the A.C. At each half cycle, a spike wave 118 is developed, which turns on the switching means 20 so long as a signal persists from the bi-stable amplifier 36 which is caused by the condition to be corrected, i.e., the temperature of the heated medium. Thus the switching means 20 is turned on at the beginning of each signal wave, and thus only when the current is at zero value, completely eliminating back E.M.F. and disturbances in the A.C. circuit. This triggering action by the signals 118 continues so long as the temperature of the medium being heated remains below the temperature to which it is to be heated.

A great advantage of the invention resides in the fact that since the switching step is performed at the beginning of each half-cycle, the particular frequency of the A.C. encountered does not affect the operation.

It will be understood that the zero switching step may be adapted to any of a large number of applications, and is not limited to a temperature controlling operation.

Figure 7:
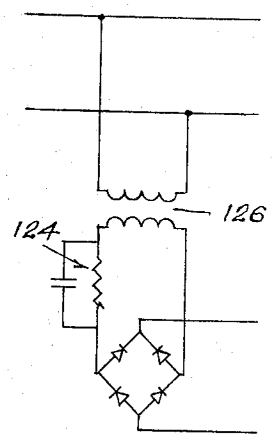
FIG. 7 is a diagram of an alternate form of transformer and related elements utilized in the circuit.
Figure 5:
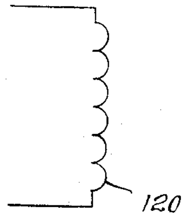
FIG. 5 is a diagram of an alternate form of load element that may be used in the apparatus.
Figure 6:
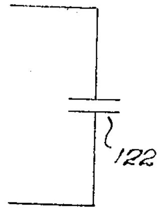
FIG. 6 is a diagram of still another form of load element that can be utilized in the apparatus.

Although the heating element 18 may be of the resistive type, it is also within the scope of the invention to utilize an inductive load, as indicated at 120 in FIG. 5, or a capacitive load, as indicated at 122 in FIG. 6. For purposes of compensating for the lagging or leading condition of the current in the latter types of loads, adjusting means 124 may be utilized in the control component 42. It is also possible to utilize a voltage transformer as shown at 126 in FIG. 7, and in this case also the adjusting control means 124 is preferably utilized.

While we have herein shown and described a certain peferred form of the invention, it will be understood that changes may be made therein within the scope of the appended claims.

We claim:

1. Apparatus of the character disclosed comprising circuit means adapted for connection with an A.C. source, switching means in said circuit means, an electrically energized load in said circuit means, means for sensing temperature changes in said load, coincidence gate means, bridge amplifier means for producing a first signal in response to a temperature change in said load and operative for transmitting it to said coincidence gate means, means for producing a second signal substantially comensurate with a half wave of the A.C., amplifier means operative, in response to said signal, for producing a spike signal at the beginning of the second signal and transmitting it to said coincidence gate means, said coincidence gate means being operative, in response to transmission of both the first signal and the spike signal simultaneously thereto, for activating said switching means.

2. The apparatus as set out in claim 1 wherein said first signal is steady and continues normally beyond a plurality of A.C. waves in said circuit means, and a plurality of said second signals are produced, one at each half wave of the A.C.

3. Apparatus of the character disclosed comprising circuit means adapted for connection with an A.C. source, an electrically energized load in said circuit means, switching means in said circuit means, means for sensing temperature changes in said load, a bridge circuit including said sensing means as a leg thereof, a bridge amplifier for signals from said bridge circuit as developed by temperature changes in said load, a bi-stable amplifier for producing constant signals in response to imposition thereon of signals from said bridge amplifier, a coincidence gate having a component energized by said constant signals, rectifier means for producing a pulsing signal for each half cycle of the A.C., a trigger circuit for converting said pulsing signals to square wave signals, a pulse generator for converting said square wave signals to spike signals, each at the beginning of the corresponding square wave signal and consequently at zero current, and transmitting them to another component of said coincidence gate, said coincidence gate being operative, in response to simultaneous transmission thereto of signals from said bi-stable rectifier means and said pulse generator, for actuating said switching means.

4. The apparatus as set out in claim 3 and wherein said switching means includes oppositely directed rectifier means in parallel branches of a conductor in said circuit means.

5. The apparatus as set out in claim 4, and wherein said rectifier means are constituted by silicon controlled rectifiers.

6. Apparatus of the character disclosed comprising circuit means adapted for connection with an A.C. source, switching means in said circuit means, an electrical load in said circuit means, and two chains of amplifying means for producing signals for controlling said switching means, a first of said chains including a D.C. rectifier connected to said circuit means and to said A.C. source when the circuit means is connected thereto, a bridge circuit connected to the output of said rectifier, means for sensing temperature changes in said load and producing electrical signals thereby, said sensing means constituting a leg of said bridge circuit, a bridge amplifier connected with the output terminals of said bridge circuit, a bi-stable amplifier connected with the output of said bridge amplifier, a coincidence gate having one component connected with the output of said bi-stable amplifier, a second of said chains including a second D.C. rectifier connected to said circuit means and to said A.C. source when the circuit means is connected thereto, a trigger circuit capable of porducing square wave signals connected to the output of said second rectifier, a pulse generator capable of producing spike wave signals connected to the output of said trigger circuit, said coincidence gate having a second component connected to the output of said pulse generator, said components of said coincidence gate being rendered conductive, and the coincidence gate itself being rendered operative, in response to simultaneous imposition thereon of signals from both said chains, for actuating said switching means, said apparatus also comprising means for controlling said trigger circuit including a third D.C. rectifier connected to said A.C. circuit and operative for imposing a signal on said trigger circuit at each half wave of the A.C.

7. The apparatus as set out in claim 6 and wherein said load is resistive.

8. The apparatus as set out in claim 6 and wherein said load is inductive and said third D.C. rectifier is connected to said A.C. circuit by means of a current transformer.

9. The apparatus as set out in claim 6 and wherein said load is capacitive and said third D.C. rectifier is connected to said A.C. circuit by means of a current transformer.

10. The apparatus as set out in claim 6 and wherein said third D.C. rectifier is connected to said A.C. circuit by means of a voltage transformer.

References Cited by the Examiner

UNITED STATES PATENTS

| | | | |
|---|---|---|---|
| 2,782,994 | 1/1957 | Dotson | 328—3 X |
| 2,878,402 | 3/1959 | Kohn | 307—133 |
| 3,206,642 | 9/1965 | Farvis | 317—11 |

ORIS L. RADER, *Primary Examiner.*

T. B. JOIKE, *Assistant Examiner.*